INVENTOR.
HOWARD E. GANTZER
BY
ATTORNEY.

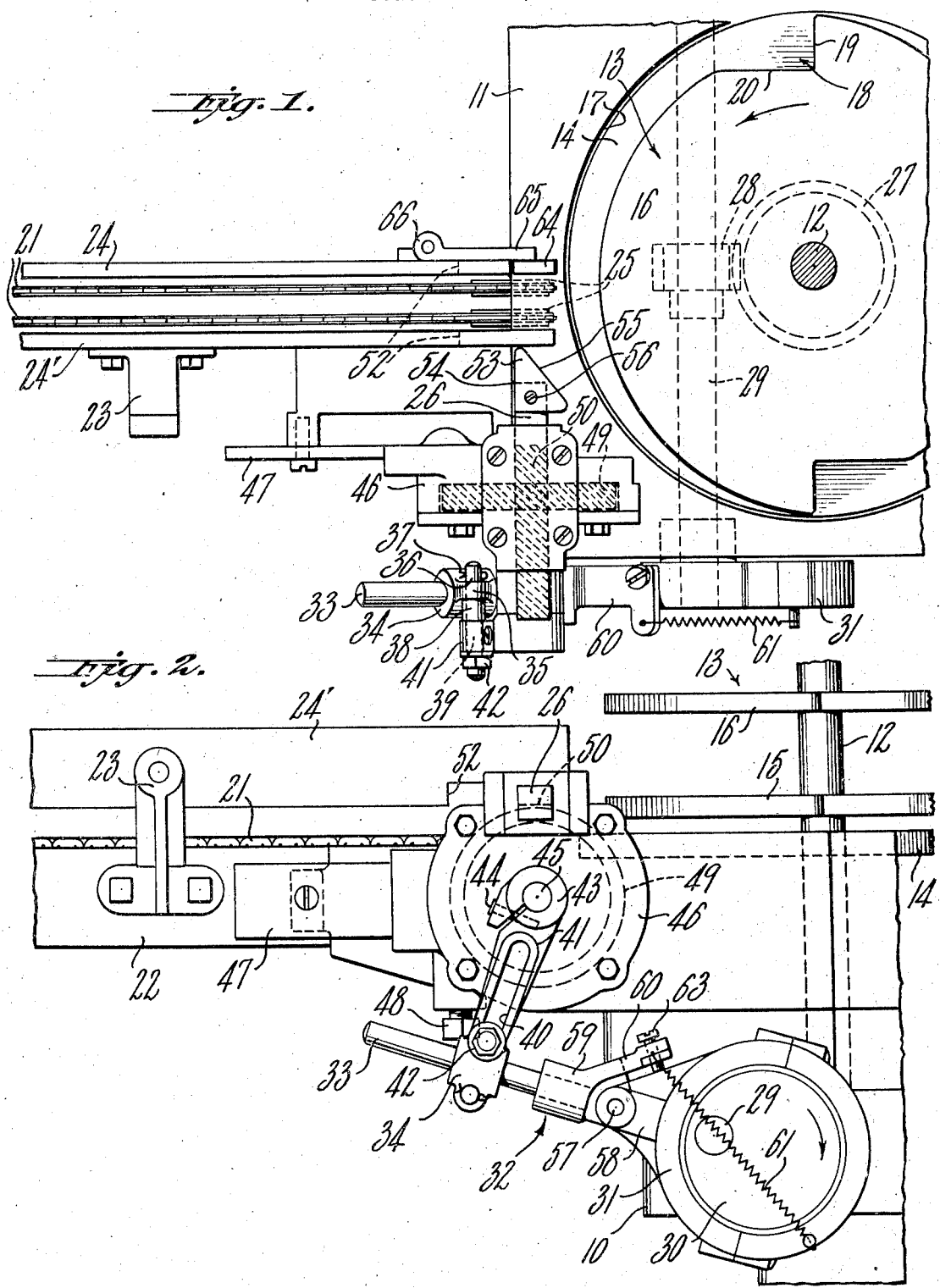

Aug. 19, 1941.  H. E. GANTZER  2,252,845
CONTAINER HANDLING APPARATUS
Filed Dec. 13, 1938  3 Sheets-Sheet 3
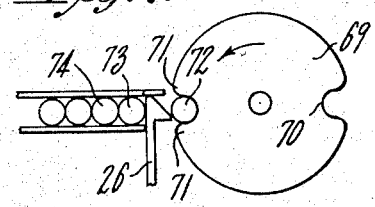
Fig. 7.
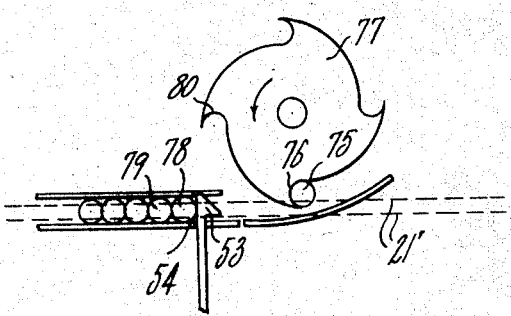
Fig. 11.
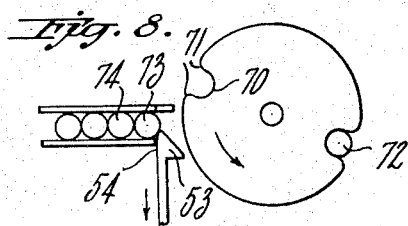
Fig. 8.
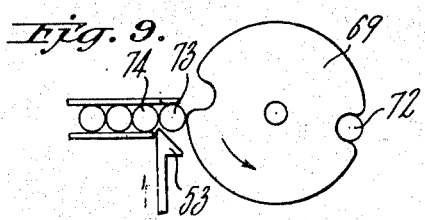
Fig. 9.
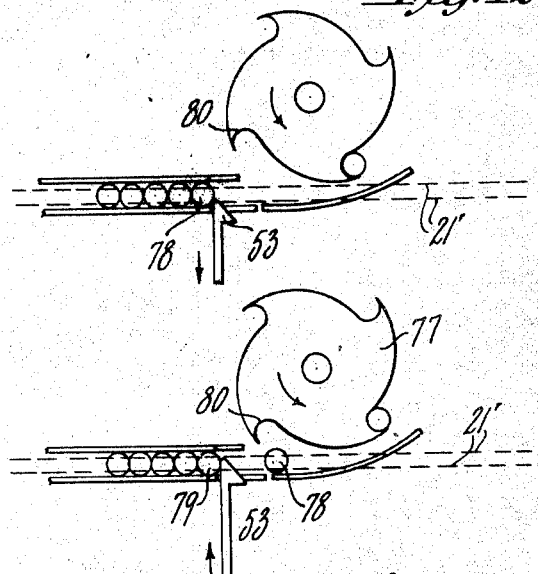
Fig. 12.
Fig. 13.
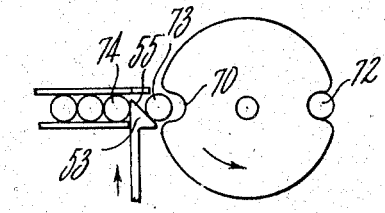
Fig. 10.
INVENTOR.
HOWARD E. GANTZER
BY
ATTORNEY.

Patented Aug. 19, 1941

2,252,845

UNITED STATES PATENT OFFICE 2,252,845

CONTAINER HANDLING APPARATUS

Howard E. Gantzer, Kenmore, N. Y., assignor to Consolidated Packaging Machinery Corporation, Buffalo, N. Y., a corporation of New York Application December 13, 1938, Serial No. 245,374

5 Claims. (Cl. 198—24)

My present invention relates to a feeding apparatus and, more particularly, to a separating or transfer device particularly adapted to separate or transfer objects from one form of conveying means to another.

More particularly, my invention relates to a device for separating objects carried in a solid line upon one conveyor for transfer to another form of conveyor or device in which the objects assume a spaced relationship. A specific application of my invention will be described in connection with a container capping device in which a solid line of containers is conducted by an intake conveyor to a star wheel adapted to separately engage and position the containers with definite relationship to other elements of the capping device.

Container capping devices frequently include a rotary star wheel which is made up of one or more axially aligned notched wheels. Containers are frequently fed in a solid line into abutting relationship with the star wheel and are urged by the conveyor thereagainst in order that the foremost container within the line may enter one of the notches in the periphery of the star wheel and be conducted by the star wheel through the capping apparatus. In many cases, the relationship between the conveyor and the star wheel is such that containers of certain types may be directly picked off the conveyor by the notches in the star wheel. In other instances, however, the speed of the star wheel, or the relationship between the conveyor and star wheel, or the shape or nature of the containers involved is such that transfer from the conveyor to the star wheel cannot be thus simply effected. For example, containers having a relatively long and narrow cross-section may be fed width-wise to a star wheel having relatively shallow notches therein with reasonable success but the same containers fed length-wise to a star wheel having appropriately deep notches present an altogether different problem. Since the containers must be inserted a relatively great radial distance into the star wheel notches and since the speed of rotation of the wheel may be such as to seriously limit the amount of time available for such insertion, it has been found that the conveyor speed must be relatively high and, in many instances, so high as to cause breakage or spillage of the containers.

In many plants, such as bottling plants, a container capping device must be fitted into a chain of devices as, for example, washing and sterilizing machines, filling machines, label pasting machines, etc. and in many such plants it is necessary that containers having relatively long and narrow cross section shall be fed length-wise.

It is an object of my invention to provide feeding mechanism by which containers may be conveniently and reliably transferred from one form of conveyor to another.

It is a further object of my invention to provide a means for separating a solid line of conveyor-borne objects for transfer to other forms of handling devices.

It is a further object of my invention to provide a means for separating a solid line of conveyor-borne objects and individually releasing said objects for delivery at accurately spaced intervals of time.

It is a more specific object of my invention to provide a transfer mechanism which will separate and transfer containers from an intake conveyor to a spacing means.

It is a further and more specific object of my invention to provide a feeding device for containers having a relatively long and narrow cross-section which feeding device shall serve to separate a solid line of such containers and transfer the same individually to the notched periphery of a star wheel.

It is a further and more specific object of my invention to provide a feeding device for containers having a relatively long and narrow cross-section which feeding device shall serve to successively separate the leading one of a solid line of such containers and to turn and project such separated container into the path of a notch in the periphery of a rotary star wheel.

Other and further objects of my invention will become more apparent from a consideration of the following description of preferred but not necessarily the only forms of my invention taken in connection with the drawings accompanying and forming a part of this specification.

In the drawings,

Fig. 1 is a plan view of a portion of a capping machine having my present invention incorporated therein;

Fig. 2 is an elevation of the same;

Figs. 7, 8, 9 and 10 are diagrammatic illustrations of the operation of a modification of my invention; and Figs. 11, 12 and 13 are diagrammatic views illustrating the operation of a further modification of my invention.

Similar characters of reference indicate similar parts throughout the several views.

Figure 3:
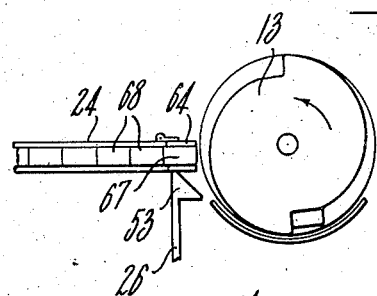
Figs. 3, 4, 5 and 6 are diagrammatic views illustrating the operation of my invention when incorporated in a capping machine of the type illustrated in Figs. 1 and 2.

In Figs. 1 and 2 of the drawings, there is shown a portion of one form of capping device to which my invention may be applied. The capping device comprises a pedestal or base 10 having an upper table-like surface 11. A vertical drive shaft 12 is driven by suitable power means such as a motor (not shown) and is mounted for rotation within suitable bearings within the pedestal 10. A star wheel indicated generally by the reference numeral 13 is fixed upon the shaft 12 for rotation therewith.

The star wheel 13 may conveniently comprise coaxial disks 14, 15 and 16. The disk 14 is preferably an unnotched circular disk and the upper surface thereof is preferably arranged to lie within the plane of the surface 11. To this end, the surface 11 has a generally circular opening 17 formed therein of slightly greater radius than the radius of the disk 14 whereby the surface 11 and the upper surface of the disk 14 form substantially an uninterrupted plane. The disks 15 and 16 may be vertically spaced from each other and from the disk 14 at distances suitable for the handling of any particular size of container. The disks 15 and 16 have vertically aligned container engaging notches formed in their peripheries for simultaneous engagement with the walls of the container. As shown in Fig. 1, a container engaging notch 18 comprises a generally radially disposed shoulder 19 and an interior wall 20 of appropriate size and angular disposition relative to the shoulder 18 for proper engagement with the particular form of container for which the star wheel is designed. The peripheral portions extending between the container-engaging notches 18 are preferably spirally cut in order that a container may be moved progressively in a radial direction toward the bottom wall 20 of a notch.

The intake conveyor may conveniently comprise a pair of conveyor chains 21 conducted over and driven by suitable sprockets 25. It will be understood that the conveyor sprockets may be driven in any suitable manner from the drive shaft 12 in order to provide suitable timing of operation of the conveyor relative to rotation of the star wheel 13. The conveyor chains 21 are carried by frame 22 suitably secured to the pedestal 10.

The conveyor frame 22 has mounted thereon suitable brackets 23 which serve to support oppositely disposed guide rails 24 and 24' located above the conveyor chains 21. The guide rails 24, 24' serve to guide a line of containers carried by the conveyor chains 21.

The conveyor chains 21 extend along the frame 22 to the edge of the table surface 11 at which point the chains are conducted beneath the surface 11 and around the sprocket wheels 25 for return. The upper surfaces of the chains 21 are preferably located substantially within the plane of the surface 11 in order that containers carried by the chains may be smoothly transferred therefrom to the surface 11.

It will be understood from the foregoing that the portion of the surface 11 extending between the conveyor chains and the star wheel serves as a dead plate over which a container will be pushed by the succeeding containers within a line thereof carried by the conveyor chains 21 and that the normal operation of the device thus far described would involve the pushing of the foremost container of such a line into engagement with the spirally cut periphery of the star wheel 13 and the progressive insertion thereof into seating engagement with the next presented notch 18.

According to the present invention, I provide means for separating the leading container from the line upon the conveyor 21 and for individually projecting such containers into the path of the star wheel 13. To this end, I provide a member 26 reciprocable across the path of the containers upon the intake conveyor in timed relation to the rotation of the star wheel 13.

A preferred form of means for imparting timed reciprocatory motion to the member 26 is shown in Figs. 1 and 2. The drive shaft 12 has fixed thereon a suitable gear 27 arranged in driving relation with a gear 28 fixed upon a shaft 29 rotatably mounted in the base 10. One end of the shaft 29 projects outwardly from the base 10 and has fixed thereon an eccentric 30. The outer periphery of the eccentric 30 is preferably cylindrical and carries a strap or bearing 31 forming a part of a connecting rod 32 which will be more fully described hereinafter. The connecting rod 32 terminates in a cylindrical extension 33 to which a clamp 34 may be adjustably secured.

The clamp 34 has formed thereon an upwardly extending, perforated ear 35 which receives one end of a pivot pin 36. The pin 36 is drilled to receive a cotter pin 37 to hold the same in a freely pivotal relation with the gear 35. The pin 36 is provided with an enlarged portion or shoulder 38 and a threaded extension 39 adapted to extend through a slot 40 in a lever 41. A nut 42 is threaded upon the extension 39 and is adapted, together with the shoulder 38, to grip the lever 41 and to secure the pivot pin in adjusted position within the slot 40.

The lever 41 is adjustably secured as by a slotted collar 43 and clamp bolt 44 to a rock shaft 45 rotatably mounted within a casing 46. The casing 46 is mounted for adjustment along a rail 47 secured in a convenient manner to the frame of the capping machine. A set screw 48 is provided to hold the casing 46 in desired position upon the rail 47.

The rock shaft 45 has fixed thereon a gear 49 of suitable design for operative engagement with angularly disposed rack teeth 50 cut in the lower surface of the member 26. The member 26 is mounted for lengthwise reciprocation within a suitable slide-way forming a part of the casing 46 and it will be apparent that limited angular rocking of the shaft 45 will result in proportionately limited reciprocation of the member 26.

Preferably, the member 26 is supported for reciprocation in a plane reasonably adjacent the plane of the surface 11 since the containers may be more accurately controlled by contact near their bases. Consequently, the guide rails 24, 24' may have the lower portions thereof cut out as indicated at 52 in order to permit the member 26 to work thereunder. As shown in Fig. 2, the cut out portion 52 may be extended back along the path of the containers to permit adjustment of the casing 46 and member 26 along the rail 47 in order to accommodate containers of various sizes.

The member 26 is provided with a head 53 arranged to present a transverse face 54 to the line of containers upon the intake conveyor 21. When the head 53 is projected into the path of the containers, the surface 54 will hold the line of containers stationary. During such periods, the conveyor chains 21 will continue to move, slipping idly beneath the stationary containers and bringing additional containers from a source of supply into contact with the stationary line. As will be more fully explained hereinafter, the head 53 is withdrawn from the path of the containers in proper timed relation to the rotation of star wheel 13 and remains so withdrawn for a time sufficient to permit the conveyor to move the leading container past the head 53 and upon the surface 11. At the proper time, the head 53 is projected between rear of the leading container and the front of the next succeeding container within the line. To this end, the head 53 is preferably wedge-shaped and is formed with an inclined face 55 which serves to exert a wedging or camming action upon the leading container to move the same into engagement with the star wheel 13.

The head 53 is detachably connected to the reciprocating member 26 as by a screw 56. It is contemplated that a number of heads 53 of various sizes and shapes may be provided for cooperation with containers of various sizes and types.

A give-way mechanism may be provided in the driving means for the reciprocating member 26 in order to prevent damage to the machine or to a container in the event that the line of containers should become mis-timed relative to the operation of the member 26. As shown in the drawings, the give-way mechanism may be incorporated in the connecting rod 32. To this end, the connecting rod 32 may conveniently be formed in two sections pivotally connected as by a pin 57. One of the sections may comprise an ear 58 formed upon the eccentric bearing or strap 31 while the other section may comprise the rod 33 and a casting 59 having means therein to receive the pin 57. An extension 60 is formed upon the casting 59 to project over the pin 57. A contractile spring 61 is stretched between suitable anchorages formed upon the extension 60 and the bearing 31. An adjustable stop screw 63 is threaded through the extension 60 and is adapted to limit relative pivotal movement between the two rod sections in the direction urged by spring 61. The connecting rod 32 is thus in effect a toggle whose members are held in straightened position by the spring 61.

The give-way mechanism just described operates as follows: Clockwise rotation of the eccentric 30 from the position shown in Fig. 2 will impart a generally endwise motion to the connecting rod 32 to swing the lever 41 in a clockwise direction. This portion of the stroke of eccentric 30 will rotate the shaft 45 in a clockwise direction and the gear 49 and rack 50 will impart an endwise motion to the member 26 to project the head 53 across the path of the conveyor 21. In the event that a container is so positioned as to obstruct the movement of the head 53, the resistance to movement thereof will cause the toggle connecting rod 32 to break against the tension of spring 61. Continued rotation of the eccentric 30 will merely swing the broken toggle about its pivots without danger of breaking the container or damaging of the mechanism. As soon as the obstruction is cleared, the spring 61 will draw the rod 32 back into operative position.

The mechanism above described for driving the member 26 in its reciprocations across the path of the conveyor 21 is designed to move the member 26 in a particular manner found to be advantageous. During the first ninety degrees of rotation of the eccentric 30 in a clockwise direction from the position illustrated in Fig. 2, the motion imparted to the connecting rod 32, lever 41 and member 26 will be substantially uniformly accelerated. The second ninety degrees of rotation will produce a substantially uniformly decelerated motion of the member 26. The third ninety degrees of rotation will produce a substantially uniformly accelerated motion of the member 26 in the opposite direction and the last ninety degrees of rotation will continue motion in this opposite direction which will be substantially uniformly decelerated. Thus, for each complete rotation of the eccentric 30, the member 26 will be projected across the path of the conveyor 21 and will be returned to its initial position. The acceleration and deceleration of motion of the member 26 will cause the head 53 to move rapidly in the mid-portion of its stroke and to move relatively slowly at each of the ends thereof. This particular motion of the head 53 is substantially a simple harmonic motion and provides for a substantial dwell of the head 53 out of the path of the containers and a substantially rapid thrust across the path for movement of the leading container.

In Figs. 3 to 6 inclusive, I have shown the operation of my invention in connection with containers having a relatively long and narrow cross-section which containers are presented lengthwise to a star wheel. In illustrating this particular use of my invention, I have shown a yielding extension formed upon the guide rail 24 for the purpose of enabling the containers to be turned through ninety degrees as they are projected upon the star wheel. This yielding extension is illustrated in Fig. 1, although it will be understood that such extension is not essential to my invention and would be unnecessary in the handling of containers of other types. As shown in Fig. 1, I have provided an extension 64 suitably carried by an arm 65 of a spring hinge 66 mounted upon the guide rail 24. The hinge 66 is spring urged into the position illustrated in Fig. 1 in which the extension 64 forms a substantial continuation of the rail 24. It will be understood that the extension 64 and hinge mechanism thus described may be cut away as at 52 to permit operation of the member 26 thereunder.

Figure 4:
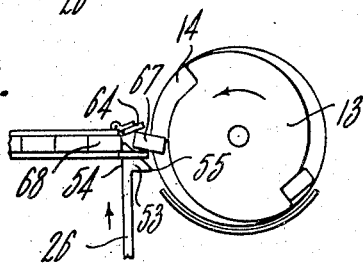
Figure 5:
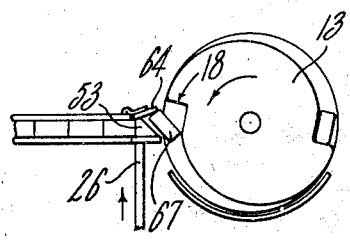
Figure 6:
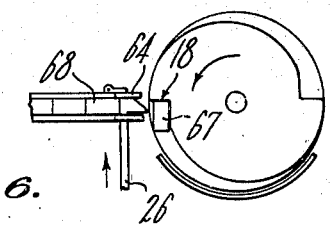

Referring back to Figs. 3 to 6 inclusive, I have shown a line of containers comprising a leading container 67 and a succeeding series of containers indicated at 68 carried by the intake conveyor. As shown in Fig. 3, the leading container 67 is being pushed by the line of containers 68 into proximity with the star wheel 13 and the head 53 is completely withdrawn from the path of the containers. Fig. 3 thus corresponds to the position of the parts illustrated in Figs. 1 and 2. As the machine is driven from the position of Fig. 3 to that of Fig. 4, the leading container 67 has been pushed upon the disk 14 of the star wheel and since the disk is rotating with the star wheel, the frictional drag thereof upon the container will tend to turn the container in a clockwise direction as indicated in Fig. 4. During this operation of the machine, the nose of head 53 will be projected between the leading container 67 and the next succeeding container 68 and the transverse face 54 of head 53 will serve to hold the entire line of containers 68 against further movement. Continued forward motion of the head 53 will cause the inclined face 55 thereof to project the container 67 onto the disk 14 and will assist the disk 14 in turning the container as indicated in Fig. 5. During this portion of the operation of the machine, the extension 64 may yield with the turning container, as shown in Figs. 4 and 5. As the star wheel and head 53 move from the position shown in Fig. 5 to that of Fig. 6, the container will be completely turned and projected into seating engagement with the notch 18 of the star wheel. As explained above, the motion of the head 53 is relatively rapid during the period thereof illustrated in Figs. 4 and 5 and consequently the container 67 will be rapidly and efficiently turned and projected into proper relationship with the star wheel 13. During the return motion of the head 53 from the position shown in Fig. 6 to that shown in Fig. 1, the containers 68 remain stationary and the container 67 is conducted through the capping machine or other device with which my invention is to be used. During the latter portions of its return movement, the head 53 is moving relatively slowly and will be withdrawn from the path of the leading container 68 for a sufficient period of time to permit the same to be projected into a position previously occupied by the container 67 and illustrated in Fig. 3.

In Figs. 7 to 10 inclusive, I have illustrated the use of a modified form of my invention in which containers are directly projected into relatively close fitting notches in a star wheel of different design. In these figures, the star wheel 69 is shown as a circular disk having notches 70 formed therein which are designed to substantially conform to the outline of the containers to be used therewith. The notches 70 are rounded off as indicated at 71 in order to facilitate the introduction of containers thereto. As shown in Fig. 7, a container 72 is positioned within a notch of the star wheel and the member 26 is shown in substantially fully projected position across the path of succeeding containers 73, 74, etc. During operation of the machine from the position shown in Fig. 7 to that shown in Fig. 8, the container 72 is conducted through the capping device while containers 73, 74 are held stationary by the transverse face 54 of the head 53. In Fig. 8, the nose of the head 53 is shown as it is about to disengage the container 73 to permit the same to be projected by the conveyor into the position shown in Fig. 9. In Fig. 9, the container 73 has progressed beyond the head 53 and the head has started its forward motion while in Fig. 10 the head 53 has been projected between container 73 and 74 and the inclined face 55 thereof is now actively projecting the container 73 into a seated position within the notch 70.

The relatively rapid motion of the head 53, during the period of operation thereof in which the face 55 is active to project the container 73 into the notch 70, results in a rapid and efficient seating of the container within its notch. The angularity of the face 55 and the speed of the head 53 may be so chosen as to project the container more rapidly than could be safely secured by motion of the conveyor 21 and thus the overall production of the capping machine may be materially increased.

In Figs. 11 to 13 inclusive, I have illustrated the operation of a modification of my invention in which the conveyor indicated by broken lines 21' runs substantially tangent to the pitch line of a star wheel. In this particular form of machine, containers must be individually released from a source of supply in accurately timed relationship with the progress of the star wheel notches in order that the container will be in proper position upon the conveyor for engagement by a notch. As shown in Fig. 11, a container 75 has been engaged in a notch 76 of the star wheel 77. A line of containers 78, 79, etc. is shown upon the conveyor 21' and such containers are held stationary by the transverse face 54 of the head 53. In Fig. 12, the head 53 is about to be withdrawn from contact with the container 78 and an empty notch 80 is shown to be approaching engaging position. During movement of the machine from the position shown in Fig. 12 to that shown in Fig. 13, the head 53 has been withdrawn from the path of the container 78 and has been projected into the path of the container 79. The container 78 has been progressed by the conveyor 21' into a position wherein the notch 80 may accurately engage the container.

In the use of my invention illustrated in Figs. 11 to 13, it will be appreciated that accurate timing between the rotation of the star wheel 77 and release of the leading container is of utmost importance. The various adjustments of length of stroke of the member 26, effected by movement of the clamp 34 along the rod 33 or by movement of the bolt 39 within the slot 40 of lever 41, together with such adjustments as may be made between driving gears 27 and 28 for the eccentric shaft 29, afford ample flexibility whereby extremely accurate timing may be effected.

The adjustments above referred to are, of course, of great utility in connection with the uses of my invention shown in Figs. 3 to 10. The speed, length of stroke and acceleration of the member 26 may be accurately varied in order to secure proper cooperation with containers of many sizes and shapes and to afford proper seating of such containers within star wheels of various types.

The above detailed description sets forth preferred forms and uses of a device which secure the objects of my invention. It is obvious that variations and modifications in form and use may be resorted to by those skilled in the art. It is my intention that the above description shall be taken in a descriptive rather than in a limiting sense and that the scope of my invention shall be established only by the following claims:

I claim:

1. In a device for capping containers having relatively long and narrow horizontal cross sections, the combination of a rotary star wheel, a conveyor adapted to continuously urge a solid line of said containers toward said star wheel, guide means associated with said conveyor for maintaining said containers in a path approximately radial to said star wheel, said star wheel having notches therein adapted to receive said containers in positions wherein the longer cross-sectional dimensions thereof extend substantially circumferential of said star wheel, a wedge shaped member reciprocable across the path of said conveyor, and means for reciprocating said member, said member and said guide means together being effective to separate a container from said solid line and to coact with said star wheel and turn said container about its vertical axis into engaging position relative thereto.

2. In a container capping device, the combination of a rotary star wheel, a conveyor adapted to continuously urge a solid line of containers toward said star wheel, guide means associated with said conveyor for maintaining said containers in a path approximately radial to said star wheel, a member having an abutment face projectible into the path of said line of containers to hold said line against movement and retractable from said path to release said line for movement, said member having a second face inclined relative to said abutment face, and means to reciprocate said member in timed relation to the rotation of said star wheel whereby on one movement of reciprocation said abutment face is retracted to successively release said containers for individual movement toward said star wheel, and on the other movement of reciprocation said second face together with said guide means is effective to move each released container with decreasing speed into engagement with said star wheel.

3. In a container capping device, the combination of a rotary star wheel, a conveyor adapted to continuously urge a solid line of containers toward said star wheel, guide means associated with said conveyor for maintaining said containers in a path approximately radial to said star wheel, a member having an abutment face projectible into the path of said line of containers to hold said line against movement and retractable from said path to release said line for movement, said member having a second face inclined relative to said abutment face, and means to reciprocate said member in timed relation to the rotation of said star wheel whereby on one movement of reciprocation, said abutment face is retracted to successively release said containers for individual movement toward said star wheel and on the other movement of reciprocation, said second face together with said guide means is effective to move each released container into engagement with said star wheel, said last named means being adapted to move said container relatively rapidly in the mid-portion of its travel and relatively slowly as it engages said star wheel.

4. In a device of the class described, the combination of a conveyor adapted to deliver a solid line of objects, guide means associated with said conveyor and adapted to maintain said objects in a predetermined straight-line path of travel, a second conveyor adapted to separately engage and remove successive objects from said line and in a direction substantially normal thereto, reciprocatory means including a wedge shaped member insertible between the leading object in said line and the succeeding object therein, and means for reciprocating said member, said member and said guide means together being effective to project said leading object at a relatively rapid rate of speed toward said second conveyor and to further project said leading object into engagement with said second conveyor with decreasing speed while holding said succeeding objects in a stationary position upon said first conveyor.

5. In a device for capping containers having relatively long and narrow horizontal cross-sections, the combination of a rotary star wheel, a conveyor adapted to continuously urge a solid line of said containers toward said star wheel, guide means associated with said conveyor for maintaining said containers in a path approximately radial to said star wheel, said star wheel having notches therein adapted to receive said containers in positions wherein the longer cross-sectional dimensions thereof extend substantially circumferential of said star wheel, a member having an abutment face projectible into the path of said line of containers to hold said line against movement and retractable from said path to release said line for movement, said member having a second face arranged in a plane inclined to the path of said containers, and means to reciprocate said member in timed relation to the rotation of said star wheel whereby on one movement of reciprocation said abutment face is retracted to successively release said containers for individual movement toward said star wheel and on the other movement of reciprocation the second face of said member together with said guide means is effective to move each released container at a relatively rapid rate of speed toward said star wheel and to further move said container into engaging relation with said star wheel with decreasing speed, said member and said guide means together being effective to coact with said star wheel and turn said container about its vertical axis into engaging position relative thereto.

HOWARD E. GANTZER.